(12) United States Patent
Agrawal et al.

(10) Patent No.: US 6,415,305 B1
(45) Date of Patent: Jul. 2, 2002

(54) METHOD FOR DISPLAYING EDITABLE CHARACTERS IN A DIVIDED TABLE CELL

(75) Inventors: Siddharth Agrawal, Redmond; Bret David Ahlstrom, Renton; Meredith Anne McClurg, Bellevue; Cy Anne Cedar, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/063,343

(22) Filed: Apr. 20, 1998

(51) Int. Cl.$^7$ .................. G06F 15/00; G06F 17/24; G06F 17/21

(52) U.S. Cl. .................. 707/503; 707/504; 707/509; 345/886

(58) Field of Search .................. 707/509, 504, 707/506, 503; 345/440, 115, 886, 604; 341/63

(56) References Cited

U.S. PATENT DOCUMENTS

| | | | | |
|---|---|---|---|---|
| 5,021,973 A | * | 6/1991 | Hernandez et al. | 707/504 |
| 5,317,686 A | * | 5/1994 | Salas et al. | 707/503 |
| 5,379,372 A | * | 1/1995 | Wu | 707/506 |
| 5,603,021 A | * | 2/1997 | Spencer et al. | 345/604 |
| 5,680,557 A | * | 10/1997 | Karamchetty | 345/334 |
| 5,717,939 A | * | 2/1998 | Bricklin et al. | 707/503 |
| 5,880,742 A | * | 3/1999 | Rao et al. | 345/440 |
| 6,072,461 A | * | 6/2000 | Haran | 345/115 |
| 6,104,325 A | * | 8/2000 | Liaw et al. | 341/63 |
| 6,185,582 B1 | * | 2/2001 | Zellweger et al. | 707/503 |
| 6,317,758 B1 | * | 11/2001 | Madsen et al. | 707/504 |

OTHER PUBLICATIONS

Wilde, Nicholas et al., Spreadsheet–based interactive graphics: form prototype to tool, ACM CHI '90 Proceedings, Apr. 1990, pp. 153–159.*

Burnett, Margaret M. et al., Graphical Definitions: Expanding Spreadsheet Languages through Direct Manipulation and Gestures, ACM Transactions on Computer–Human Interactions, vol. 5, No. 1, Mar. 1998, pp. 1–33.*

Stadelmann, Marc, A spreadsheet based on constraints, ACM Symposium on User Interface Software and Technology, pp. 217–224, Nov. 1993.*

* cited by examiner

*Primary Examiner*—Joseph H. Feild
*Assistant Examiner*—William L. Bashore
(74) *Attorney, Agent, or Firm*—W. Scott Petty; A. Shane Nichols; King & Spalding

(57) ABSTRACT

A divided table cell is generated by selecting one cell in a table and creating a new cell to display over the selected cell. Both cells contain a constraint that define an area where that cell cannot display objects. Objects comprise alphanumeric characters, graphical symbols or any representation in a table cell. The cells are displayed over top of each other such that the display area of one cell coincides with the constraint area of the other cell. The display shows a divided cell capable of accepting and editing objects. The divided cell also retains the characteristics of other cells in the table. The object layout in a cell with a constraint utilizes test rectangles to calculate the height and width of the displayable area of the cell. An initial test rectangle is calculated using the full width of the cell and the height of the objects to be placed in it. The initial test rectangle is then modified by applying the constraint to the initial test rectangle and removing all the sections, preferably rectangular sections, of the initial test rectangle that intersect the constraint. The resulting objects that fit in the modified test rectangle are presented in the display.

21 Claims, 6 Drawing Sheets

| NOVEMBER | | | | | | |
|---|---|---|---|---|---|---|
| | | | | | | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 / 30 | 24 | 25 | 26 | 27 | 28 | 29 |

FIG. 1a

| SUPERCAR FEATURE IMPROVEMENT HISTORY | | | |
|---|---|---|---|
| BODY TYPE / MODEL YEAR | 1992 | 1993 | 1994 |
| SEDAN | ADJUSTABLE SEATS | HEATED SEATS | WATER-FILLED SEATS |
| CONVERTIBLE | RAG TOP | BURLAP TOP | POLYKNIT TOP |
| WAGON | FAKE WOOD PANELING | PARTICLE-BOARD PANELING | PLYWOOD PANELING |

FIG. 1b

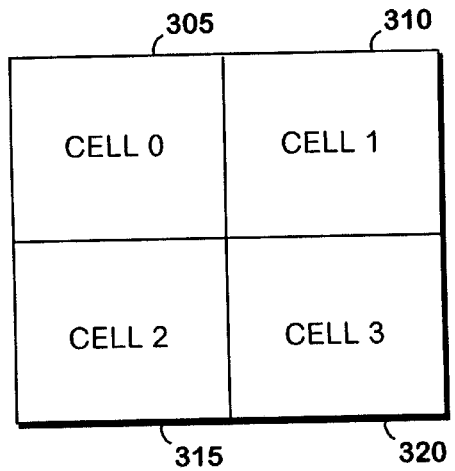
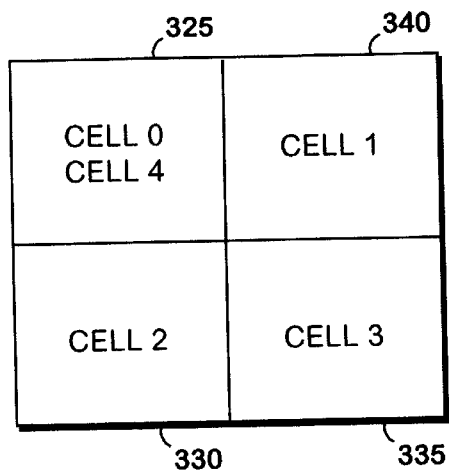
FIG.3a
FIG.3b
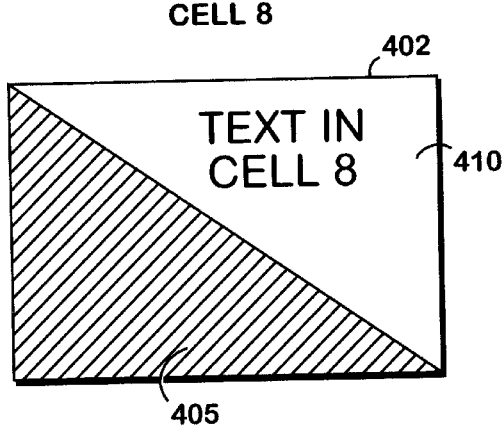
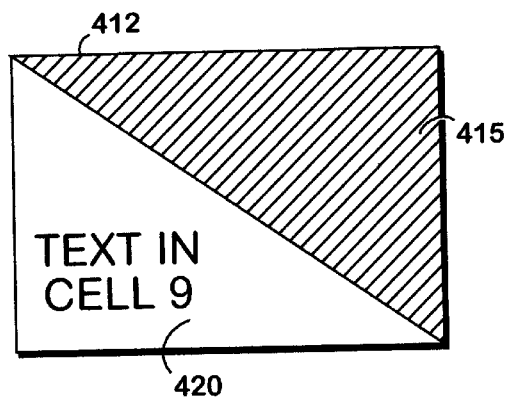
FIG.4a
FIG.4b

METHOD FOR DISPLAYING EDITABLE CHARACTERS IN A DIVIDED TABLE CELL

FIELD OF THE INVENTION

The field of the invention relates to the display of objects, particularly linguistic and other communicative symbols, in a table cell, and specifically, to display objects, capable of being edited, in a divided table cell.

BACKGROUND OF THE INVENTION

Tables are used extensively in today's computing environment. The uses of tables include organizing topics under categories, creating financial reports, organizing employee records, as well as many other ways where it is desirable to manage or represent related data. Because of the many uses of tables, word processing, spreadsheet, database, and desktop publishing applications have all provided functional support for the use of tables.

As the use of tables proliferate, the demands for more sophisticated table support in the applications while making them easier to use has increased. Examples of these increased demands include simpler table creation and manipulation, the display of borders around the table and the individual cells within the table and providing calculation functions on the cells within the table. These increased demands are present for tables wherever they are found: in word processing, spreadsheet, database, and desktop publishing applications. Effective presentation of data is the goal.

One demand that has risen is to create a divided cell in a table. For example, diagonally divided cells are most commonly used in a table to block off specific cells of the table signifying that no entries may exist for that cell. However, other needs for divided cells also exist. These needs include incorporating objects in a divided cell. Objects comprise linguistic and other communicative symbols, including alphanumeric characters, graphic symbols, or any representation in a table cell. FIGS. 1a and 1b illustrate two examples of other uses of a divided cell. FIG. 1a illustrates a calendar wherein the divided cell 3, in this case a diagonally divided cell, is used to represent two days of the month within a single cell. FIG. 1b illustrates a table with row and column headings wherein the divided cell 7, also a diagonally divided cell, depicts category headings for the table's rows and columns. Note that in both of these examples, text objects are displayed on both sides of the diagonal. Having text objects on both sides creates a need such that the user can enter text on both sides as well as edit the existing text on both sides of the diagonal.

To address this need, one existing implementation includes drawing a line to divide the cell diagonally in either direction (i.e., from the Northwest corner of the cell to the Southeast, or from the Northeast corner to the Southwest) as well as drawing an "X" over the cell. However, in this implementation, the drawing of the diagonal line renders the cell uneditable. This drawback also creates an inconsistency from a user interface standpoint. The cell with a diagonal drawing creates an inconsistency because it is an anomaly within the table. Unlike the other cells in the table, no data may be placed in the cell and it is uneditable.

Other implementations that attempt to get around this uneditability of a divided cell with a diagonal include creating a separate text object that floats above the diagonal cell on the display. However, in this implementation, the text object is distinct from the table structure providing unwanted side effects. For example, whenever the table cell is resized or the format of the cell is changed, a separate editing step is required to modify the "floated" text object so that it conforms with the rest of the table.

And yet another implementation includes restricting the text to a fixed-pitch grid and drawing lines through the breaks in the letters. However, this also requires multiple editing steps when parameters of the cell are changed. In addition, this solution does not work when the font in the text is one of the commonly used proportional spaced fonts.

Accordingly, there is a need in the art to generate a divided cell, which provides editing on both sides of the division and minimizes the steps required when editing objects in the cell and manipulating the parameters of the cell.

SUMMARY OF THE INVENTION

The present invention meets the needs described above by providing a method for generating a divided cell and displaying objects in the divided cell in such a manner as to allow for efficient editing of the objects. Objects comprise alphanumeric characters, graphic symbols or any representation in a table cell. For purposes of discussion, however, the present invention is described in terms of characters in a cell, but will apply to any object that may be placed in a cell.

A divided cell is generated by creating a new cell and displaying the new cell on top of a cell in the display. Each cell contains constraints. Characters contained in each cell are laid out such that no character in each cell is displayed in an area defined by a constraint.

The divided cell is generated by first selecting a cell in the table. The divided cell will be displayed at this cell location. The method of selecting the cell can be any method recognized by the application, including navigating to the cell using a keyboard entry device or clicking on the cell with a mouse input device. After the cell is selected, a new cell is generated. The new cell is structurally and functionally similar to the existing cell. The new cell is created using whatever cell creation mechanism is supported by the table and the application.

After the new cell is created, constraints are developed for each of the cells. Characteristics of the constraints include: 1) the constraint for the cell prevents any of the characters contained in that cell from being displayed in the area defined by the constraint; and 2) the constraint area defined for one cell contains the displayable area for the other cell. After generating the constraints for both cells, any characters that are currently contained in both cells or that are entered into the cells are arranged such that they do not intersect any of the area defined by the constraints in the respective cells.

After the object layout is completed, the new cell is displayed over the existing cell along with a divider. The display now contains a divided cell, made up of two cells and a divider. Each cell in the divided cell will function like any other cell in the table. Each cell can be formatted, edited independently or collectively, in the same manner as any other cell in the table. This editing can be performed by selecting the side of the divided cell the user desires to edit. The user selects the desired side of the divided cell by either 1) clicking on the side of the divided cell the user wishes to edit or reformat using a mouse input device or 2) navigating to the desired side of the divided cell using arrow and/or tab keys on a keyboard input device.

The display address of the two cells that make up the divided cell is the same because it occupies the same location in the display. However, to distinguish between the two cells, additional parameters are stored with each cell to keep them distinct. These parameters include whether the cell is part of a divided cell, how the cell is divided, and which part of the division constitutes the displayable area for that cell.

When either of the cells that make up the divided cell is edited, the constraint is recalculated, if necessary. Then the cell that is edited reapplies the constraint and modifies the display based on the edited characters.

To perform the object layout in the cell with a constraint, a first test rectangle is defined. The test rectangle has a width that is the width of the cell and a height that is based on the height of the tallest character from the set of characters that fit within the width of the first test rectangle. The test rectangle represents a line in the cell that will contain characters. The constraint in the cell is then applied to the first test rectangle. The section of the first test rectangle that intersects the area of the cell constraint is removed. It is preferable that the removed section be rectangular. The removal of the section intersecting the constraint modifies the width of the first test rectangle. A second test rectangle is generated to reflect the width of the modified first test rectangle while using the height of the first test rectangle.

If a height based on the tallest character from the set of characters that fit within the width of the second test rectangle is less than the height of the first test rectangle, then the another set of test rectangles may be calculated to provide a more proportional match between the height space allocation in the cell with the height of the character set of that fits within the width of the test rectangle.

After determining the final height and width of a test rectangle, the characters that fit into the width of this test rectangle are displayed on a line of the cell within the area defined by the final test rectangle. The object layout procedure is reiterated for as many lines in the cell as necessary to display the characters until all the characters are displayed or the procedure runs out of display area. In the case where the procedure runs out of display area, characters that do not fit into the display area remain in an overflow buffer and are not visible in the diagonal cell.

It should be recognized that text in a table is not always drawn horizontally, left to right. For example, Chinese vertical text is drawn vertically right to left, and bidirectional Hebrew or Arabic text is drawn horizontally, sometimes left to right, sometimes right to left. While the description of the present invention focuses on objects displayed horizontally, it is also considered within the scope of the present invention to display objects that are not typically displayed horizontally, left to right (i.e., vertical Chinese text or bidirectional Hebrew or Arabic text). It is further considered within the scope to display objects in the diagonal cell using different display schemes, such as displaying horizontal text in one side of the diagonal cell and displaying vertical text in the other side.

In addition, those skilled in the art will also recognize that the vertical position of the first line space is an arbitrary decision. This decision can be made to suit the needs of table display features such as centering or bottoming the location of text in a cell, or "lefting" or "righting" vertical text in a cell.

BRIEF DESCRIPTION OF THE DRAWINGS

FIGS. 1a and 1b are diagrams illustrating how divided cells are used in tables.

FIGS. 3a and 3b are diagrams illustrating how a new cell overlays an existing cell within a table to create a diagonal cell in an embodiment of the invention.

FIGS. 4a and 4b are diagrams illustrating the object layout feature within the cells that create the diagonal cell along with their respective constraints in an embodiment of the invention.

DETAILED DESCRIPTION

The present invention is directed toward a method for displaying editable characters in a divided table cell. In one embodiment, the invention may be incorporated into a desktop publishing application program, such as the application entitled "Publisher", marketed by Microsoft Corporation of Redmond, Wash. Briefly described, the method of generating a divided table cell includes the user selecting a table cell to be divided. Next the user defines how to divide the table cell. A new cell is then created with display constraints. The constraints are developed based on how the table cell is divided. The constraints define in which area of the cell characters cannot be displayed. For example, in a diagonal cell, a constraint will be a triangular shape formed by two adjacent edges of the cell and the diagonal line that joins the two free ends of the adjacent edges. The initial cell and the new cell may have different constraints so that when they are displayed on top of each other, the characters located in each of the cells do not overwrite each other. The object layout is then performed by incorporating the constraint in each cell to display the characters in each cell such that they do not overlap the constraint.

The object layout in each cell is performed by first defining a test rectangle in the cell, the test rectangle defines a line of the cell to display characters. The width of the test rectangle is the full width of the cell, and the height of the test rectangle is based on the height of the tallest character that would be displayed in the test rectangle. A constraint is then applied to the test rectangle. The constraint defines an area where characters may not be displayed. Sections of the test rectangle that intersect the constraint are removed creating a new test rectangle. It is preferable that the removed sections be rectangular. If a height based on the tallest character from the set of characters that fit within the width of the new test rectangle is less than the height based on the tallest character from the set of characters that fit within the width of the initial text rectangle, another test rectangle may be calculated to modify the height of the new test rectangle. The characters that fit the final test rectangle are then displayed in the cell.

Exemplary Operating Enviroment

Figure 2:
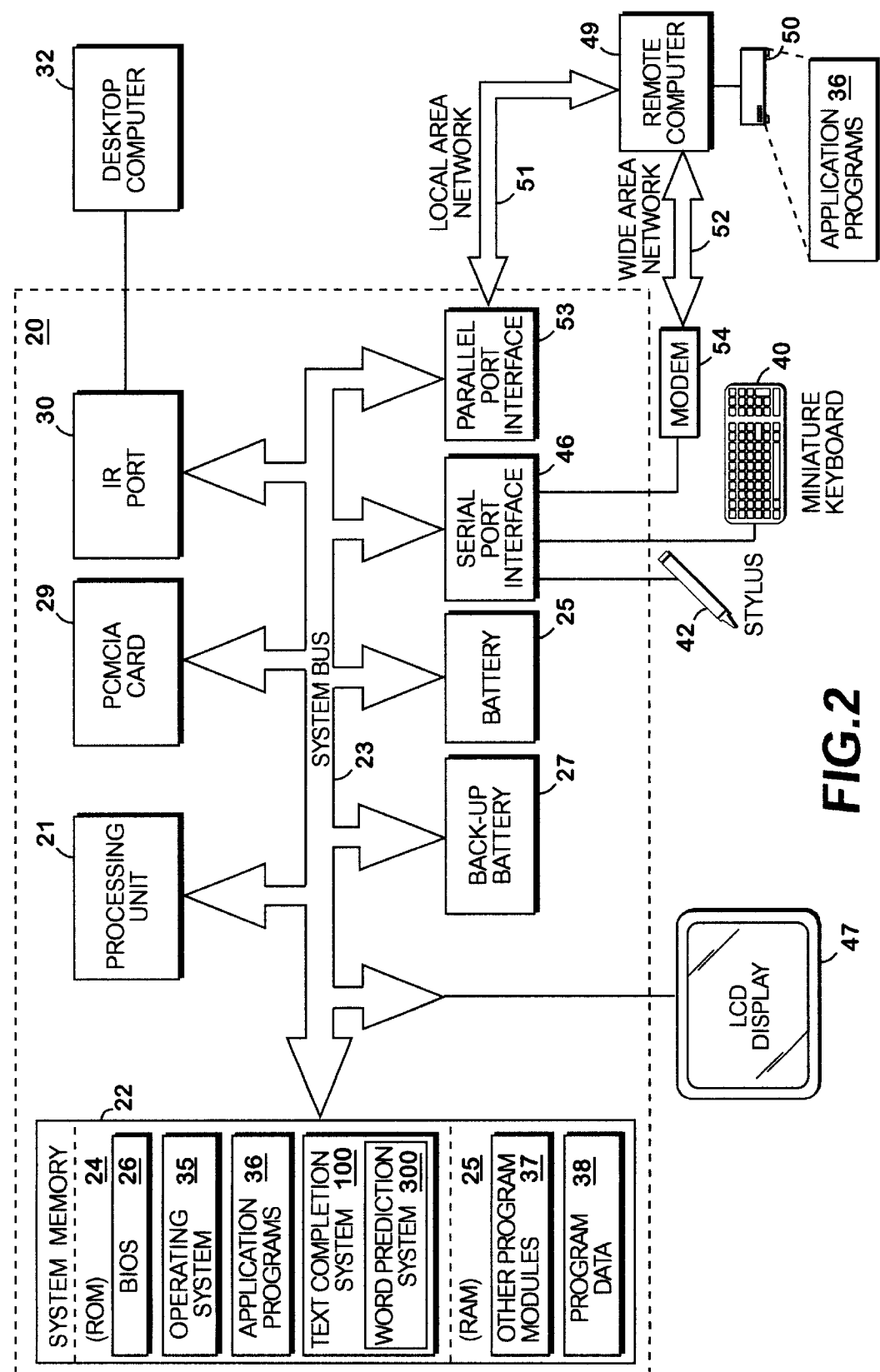
FIG. 2 is a block diagram of a personal computer illustrating the operating environment of an embodiment of the invention.

FIG. 2 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

FIGS. 3a and 3b depict how the structure of a table is modified when a new cell is created to generate a divided table cell in one embodiment of the present invention. The table shown in FIGS. 3a and 3b is made up of cells. Each cell may contain objects, which include alphanumeric characters, graphical symbols or any representation in a table cell. As stated above, however, for purposes of discussion, the present invention is described in terms of characters in a cell. Yet, it should be recognized that the present invention also applies to any object that may be placed in a cell.

Generally, the table contains an RxC number of cells. The "R" representing the number of rows in the table and the "C" representing the number of columns in the table. The table may also include title bars, legends, and other components (not shown) to help depict the information in the table. The table in FIG. 3a is a 2×2 table having four cells (cell 0 305 through cell 3 320). In one embodiment of the present invention, a new cell is created and overlaid on an existing cell to produce a divided cell. FIG. 3b illustrates how this embodiment of the present invention overlays a newly created cell over an existing cell. In FIG. 3b, the divided cell 325 actually constitutes two independent cells, cell 0 and cell 4. The independent cells are displayed on top of each other to create a divided table cell. The new cell 4 in the divided cell 325 is not a separate object outside of the table but is actually a cell defined in the table. Valid table operations that can be performed on the cells of the table can also be performed on the new cell 4.

FIGS. 4a and 4b illustrate how characters are displayed in the two overlaid cells, cell 8 402 and cell 9 412, of the divided cell in one embodiment of the invention. Normally, characters are displayed in the cell to fill the entire width of the cell using as many lines as possible to fill the cell completely. In one embodiment of the present invention, the divided cell is defined to be a diagonal cell. In this embodiment, two triangular constraints 405 and 415 are generated for each diagonal cell (i.e., a triangular constraint is generated for each cell that make up the diagonal cell). These constraints define the area of the cell that includes the display area for the other cell. For example, the triangular constraint 405 in cell 8 402 is the same relative area in the diagonal cell where the characters in cell 9 412 are displayed in the diagonal cell. And vice versa, the triangular constraint 415 of cell 9 412 includes the same relative area in the diagonal cell where the characters of cell 8 402 are displayed in the diagonal cell. Within the cell, the constraint area defines the area of the cell in which characters cannot be displayed. This allows the characters of both cells to be visible and unobstructed when they are displayed over top of each other.

In the case of diagonal cells, the two cells that define the diagonal cell only have characters displayed in the unconstrained areas 410 for cell 8 and 420 for cell 9. Cell 8 has a triangular constraint 405 that prevents any characters contained in cell 8 from being displayed in the triangular constraint 405. Similarly, cell 9 has an opposing triangular constraint 415 that prevents any characters contained in cell 9 from being displayed in the triangular constraint 415.

Note that the characters contained in the cells that make up the diagonal cell are independent of each other. In one embodiment, any characters that are in cell 8 upon the creation of cell 9 remain in cell 8. The possibility exists, however, that when cell 9 is created, the characters that are in cell 8 are copied and displayed in cell 9 as well. Another alternative is to divide the original characters, e.g. those in cell 8, into two bodies, according to the presence of break characters, such as end-of-paragraph marks. This is a design choice left to those implementing the invention.

One skilled in the art will recognize that the triangular constraint need not extend from one corner of the cell to the other. The constraint can be defined as any portion of the cell. Furthermore, the constraints need not be triangular. A cell division that creates two rectangles versus a diagonal cell may be preferred. In such a case, the constraints would be designed to define two rectangular areas of the cell.

Figure 5:
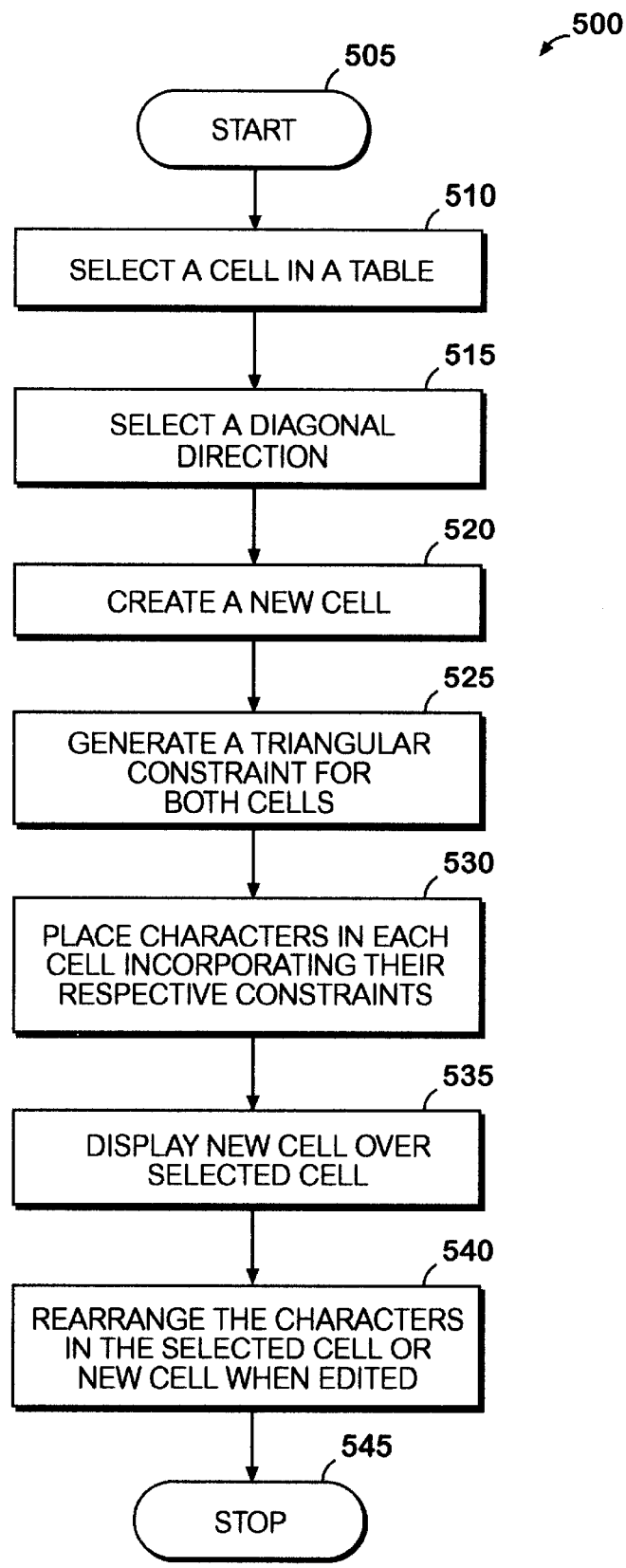
FIG. 5 is a flowchart illustrating the steps for generating an editable diagonal table cell in an embodiment of the invention.

FIG. 5 is a flowchart that shows the steps for generating an editable diagonal table cell in one embodiment of the present invention. The method 500 begins at the start step 505. In this embodiment, an application program has already been executed and a table has already been defined in the application program. The cells in the table may already contain characters or they may not. The method 500 proceeds to step 510 where the user selects a cell to be divided. Typically, a user performs the cell selection, but selection can be done by the application or by other automated means. Where the user executes the cell selection, the selection can be performed by using a mouse to select the individual cell or by navigating to the cell address using a keyboard input device. Although this embodiment performs the selection of one cell, it should be recognized by those skilled in art that several cells may be selected if more than one diagonal cell is desired. In the case where more than one cell is selected:, the number of cells created at step 520 will equal the number of cells selected. In an alternative implementation, a selection of more than one cell can be automatically merged into a single cell, and then divided.

The method 500 then proceeds to step 515 where the diagonal direction is selected. In one embodiment, there are two diagonal directions in which to divide a cell. The diagonal may divide the cell from the Northwest corner to the Southeast corner of the cell or from the Northeast corner to the Southwest corner. Consequently, in step 515, the selection of which direction to make the diagonal is performed. Where the selection is performed by the user, it may be performed through the use of a dialogue box presented to the user. The user is given the option to select one of the two diagonals, and the user selects one through the use of a mouse input device or keyboard.

As stated above, it should be recognized that a cell may be divided in many ways. For example, different ways to divide a cell include vertically across the middle of the cell, horizontally across the middle of the cell or even a stair-step diagonal. Similarly, it should be recognized by one skilled in the art that several different forms may be simultaneously supported. Having several different divisions may necessitate additional selection criteria where the user is asked to select which division he or she wishes to apply in addition to the selection of the direction of the division (e.g., diagonal) as mentioned with respect to step 515.

After the diagonal direction has been selected, the method 500 continues by creating a new cell in step 520. The new cell is created using whatever routine the current application and table support in generating a new cell. In one embodiment, the new cell initially starts with the same formatting characteristics as the selected cell. However, once created, the new cell may be formatted independently of the selected cell or any other cell in the table. In addition, because the cell is a structure of the table and not a completely independent object, the new cell will respond to any executed table operations that can be performed on other cells in the table. These operations include resizing, reformatting, and editing.

The method 500 then proceeds to step 525 where a triangular constraint is generated for the new cell as well as the selected cell. In one embodiment, a triangular constraint is defined as an array of 3 points, each point corresponding to a vertex of the triangular constraint. Both cells receive a different array defining their respective triangular constraint. The selected cell receives an array of points defining a triangular constraint which defines the triangular area bounded by two adjacent sides and the selected diagonal direction. In the case where a Northwest/Southeast diagonal direction is selected, the array of points define a triangular area located in the lower left-hand portion of the cell (e.g., see triangular constraint 405 in FIG. 4a). The triangular area is formed using the bottom and left-hand adjacent edges of the cell and the diagonal. In the same instance where a Northwest/Southeast diagonal direction is selected, the array of points for the new cell define an opposing triangular constraint to the selected cells triangular constraint. This opposing triangular constraint is defined by the upper right-hand triangle made up of the two upper and the right-hand adjacent sides of the cell and the diagonal.

It will be recognized by those skilled in the art that there are many ways to define the shape of the constraint in a cell. Any number of points and/or functions may be used to generate any number of geometric shapes that can act as a constraint area.

The method 500 then continues to place characters in both cells incorporating their respective triangular constraints in step 530. Normally, without a constraint, characters are displayed in the cell using the full height and width of the cell. However, the constraint defines an area of the cell where characters cannot be displayed. Any characters that were in the cell prior to the application of the constraint are now rearranged to avoid the constraint.

Therefore, in step 530, after the triangular constraint is applied to the selected cell, the characters that existed in the selected cell are rearranged in the selected cell taking into account the triangular constraint defined for the selected cell. Similarly, any characters that are placed in the new cell are now arranged in the new cell taking into account the opposing triangular constraint.

Proceeding to step 535, the method 500 continues to display the new cell over the selected cell, along with a diagonal, creating the diagonal cell. What is presented on the display in the area previously occupied by just the selected cell, is information contained within two cells separated by a diagonal. The diagonal line may or may not be visible on the display. Each of the cells contains a constraint preventing the characters in one cell from using a portion of that cell, the constrained portion representing the displayable area of the other cell and the diagonal. In addition, the constraint for each cell also takes into account the varying border thickness that can be applied to the diagonal. When the cells are displayed on top of each other, none of the characters in either cell overlap.

Continuing to step 540, the method 500 continues by rearranging the selected cell or new cell when any of the characters are edited. Because the diagonal cell comprises two cells, the characters displayed in the diagonal cell are editable just as any other cell in the table. After any edits are performed, the characters in the cell being edited are again rearranged using the applicable constraint. For example, if the edits are performed on characters contained in the new cell, the edited characters will be rearranged in the new cell such that they do not overlap the opposing triangular constraint. This rearranging of characters can be performed by recalculating the constraint for each edit or by caching the constraint thereby not requiring a recalculation of the constraint every time the text is edited. Either way, the diagonal cell now depicts the rearranged characters.

Therefore, in one embodiment, when the upper right-hand portion of the cell is edited, the modified characters in the selected cell are rearranged and bounded by the triangular constraint so that the modified characters are only displayed in the upper right-hand portion of the diagonal. When the lower left-hand portion of the display is edited, the modified characters in the new cell are rearranged and bounded by the opposing triangular constraint so that they are only displayed in the lower left-hand portion of the diagonal.

It will be recognized by one skilled in the art that a rearrangement also occurs when functions, other than editing, are performed on the cell that effect the object layout. For example, if the diagonal cell, or the table row, or column containing the diagonal cell, is resized to be made smaller, the displayable area has changed. In this case, new constraints are generated based on the new size of the diagonal cell, the triangular constraint is reapplied to the selected cell and the opposing triangular constraint is reapplied to the new cell. The characters displayed in the selected cell and new cell, and therefore the diagonal cell as well, are modified based on the application of the new constraints.

The method 500 then ends at step 545.

Figure 6A:
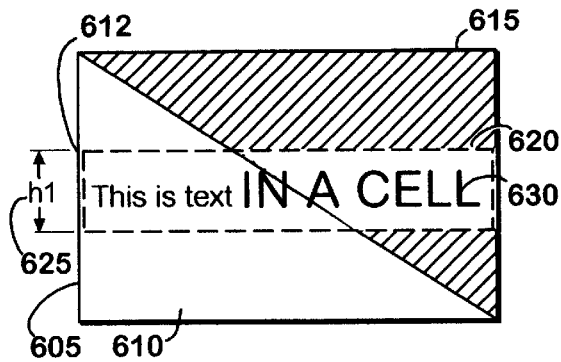
FIGS. 6a–6f are diagrams graphically depicting how characters are displayed in a table cell that includes a constraint in an embodiment of the invention.

Now referring to FIGS. 6a–6f, an object layout procedure in a cell that contains a constraint in an embodiment of the invention is depicted. FIG. 6a illustrates a cell 605 in a table. Specifically, cell 605 comprises the displayable area 610 of the cell, the constraint 615, a linespace 612 (the vertical position in the cell where the next placement of characters will begin), a test rectangle 620, and characters "This is text IN A CELL" 630. The height "h1" 625 of the test rectangle 620 is based on the tallest character from the set of characters that fit within the width of the test rectangle. In this case, the height "h1" is based on the height of the characters in the words "IN A CELL". FIG. 6a also shows that if no constraint 615 existed, the characters 630 would completely fit within the full cell width.

When the constraint 615 is applied to cell 605 and to the test rectangle 620 (FIG. 6a), a new test rectangle 635 (FIG. 6b) is generated by removing the sections of the previous test rectangle 620 that intersected the constraint 615. It is preferable that sections are removed only as rectangles of the same height as the previous rectangle, to prevent aesthetically poor display of characters in a non-rectangular line space overlapped by the constraint. Note in FIG. 6b that only a subset of the characters that fit within test rectangle 620 (FIG. 6a) fit into the new test rectangle 635. The height "h1" 625 of the new test rectangle has not changed, although the character set that is contained in the test rectangle has. In this case, the characters "This is text" 633 are much smaller in height than the new test rectangle's height "h1" 625. Because of this size differential, it is preferable to reduce the height of the test rectangle to provide a more proportional vertical spacing.

Figure 6B:
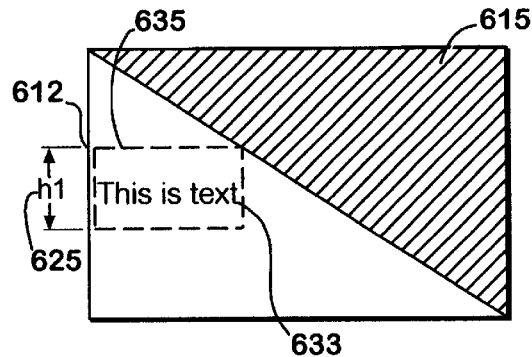
Figure 6C:
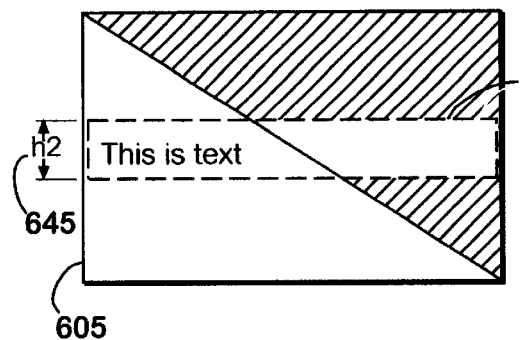

In FIG. 6c, another test rectangle 640 is generated, taking into account the height "h2" 645 of the tallest character in the set of characters 633 that fit within the width of the test rectangle 635 (FIG. 6b). The width of the test rectangle 640 is determined to be the full width of the cell 605.

Figure 6D:
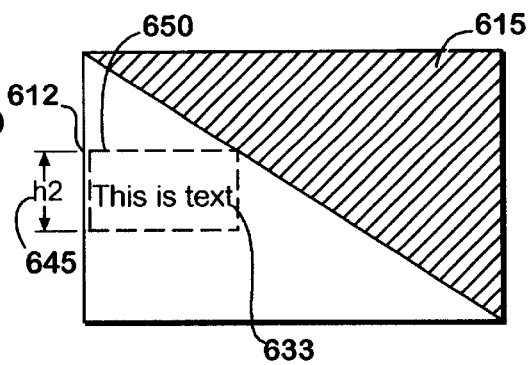

FIG. 6d shows yet another test rectangle 650 generated by applying the constraint 615 to the test rectangle 640 (FIG. 6c). This test rectangle 650 is similar to the test rectangle 635 (FIG. 6b). Because the height of this test rectangle 650 is smaller than the height of the test rectangle 635, the possibility exists that the width of this test rectangle 650 could be longer. This possibility is dependent on how the constraint intersects the test rectangle.

After displaying the characters "This is text" 633 (FIG. 6d), the linespace 612 is advanced to the next linespace 614 in the cell. Because the height of the test rectangle 635 was modified due to the height differential in the initial character set 630, the linespace 614 is only advanced the distance of "h2" 645 instead of the distance of "h1" 625. Changing the distance the linespace is advanced provides a more visually natural and proportional separation between the lines of characters.

Figure 6E:
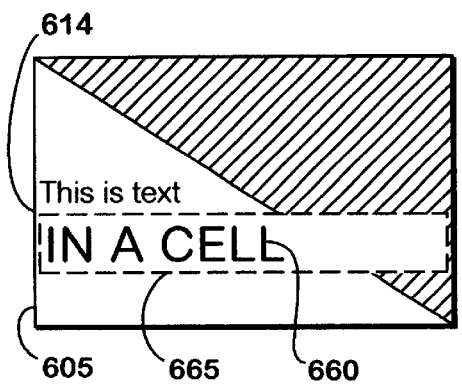
Figure 6F:
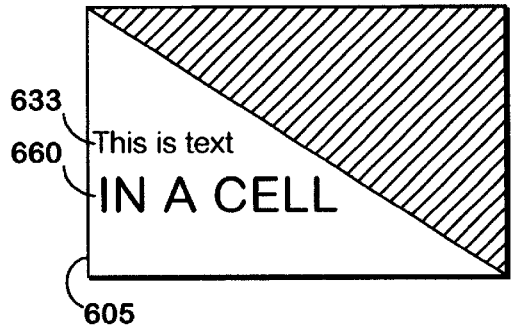

FIG. 6e shows how the remaining characters "IN A CELL" 660 are placed in a test rectangle 665 where the process begins again. FIG. 6f shows the result of how the characters 633 and 660 will be displayed in the cell when the constraint is applied.

It will be recognized that FIGS. 6a–6b illustrate the calculations used in performing the cell layout. It is not intended to show that all the items are actually displayed during the cell layout. In fact, it is preferable to perform the test rectangle calculations and the constraint calculations in memory. Determining how the characters fit into the test rectangle and the layout of the linespaces within the cell should be performed in memory prior to displaying the results in the cell to maximize efficiency.

Figure 7:
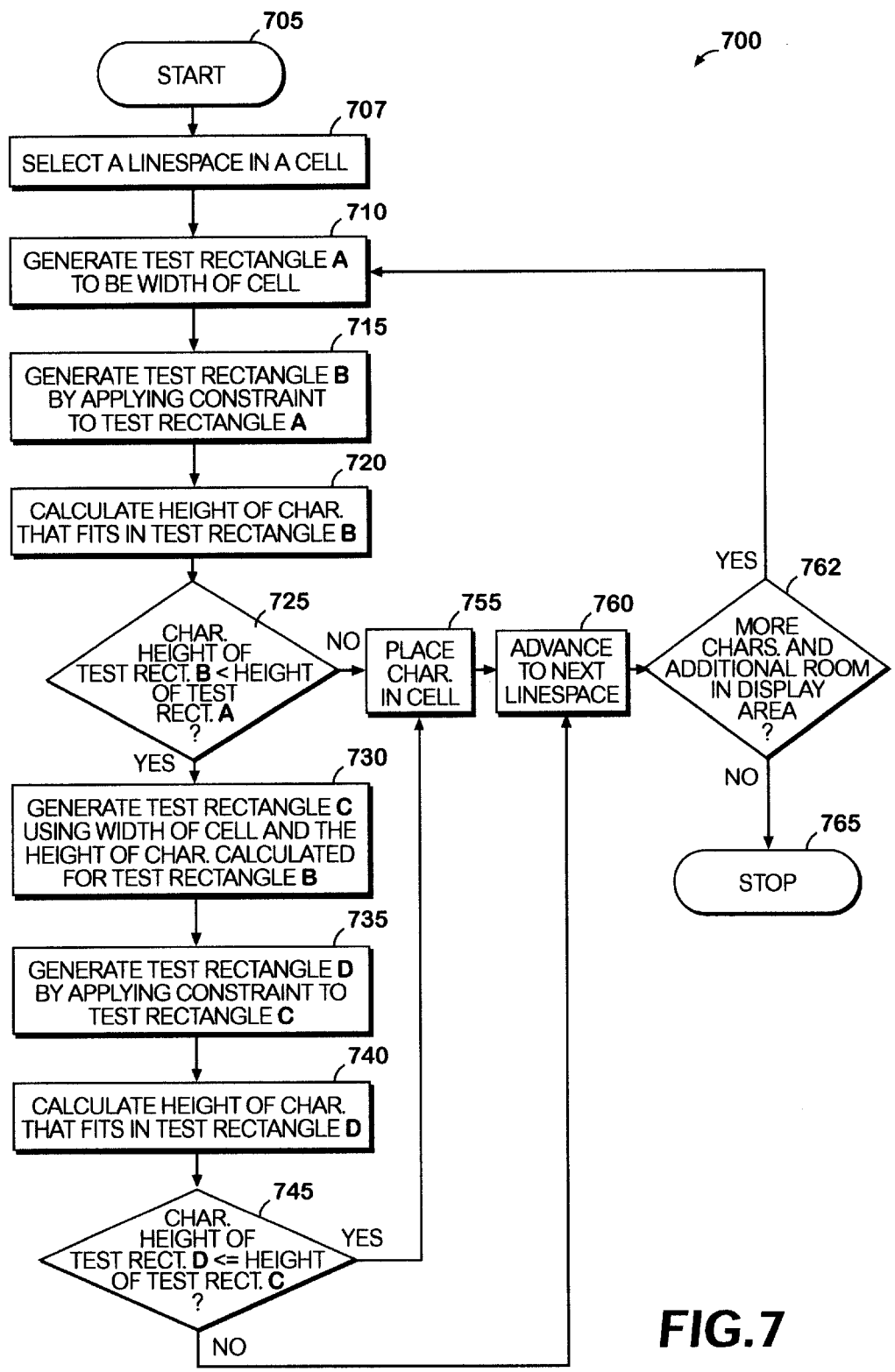
FIG. 7 is a flowchart depicting the steps for displaying characters in a table cell that includes a constraint in an embodiment of the invention.

Referring now to FIG. 7, a flowchart illustrating a method 700 for displaying characters in a table cell, which includes a constraint, in an embodiment of the invention is presented. The method 700 begins at the START step 705. At step 705, a table has already been defined by the application program. In addition, a cell in the table either contains objects or objects are being entered into the cell. The cell also has a constraint associated with it. This constraint defines an area where no characters may be displayed in the cell.

As stated earlier, objects comprise alphanumeric characters, graphic symbols or any representation in a table cell. Although for purposes of discussion, characters will be used to describe the invention, the invention also applies to any object.

The method 700 continues to step 707 where a linespace in the cell is selected. The linespace is the vertical position on the cell where the next placement of characters will begin. For example, the linespace may start at the top left-hand corner, and the characters are placed in the cell beginning at that spot until no more characters fit within the width of the cell. The linespace then advances to the next line, based on the height of the characters displayed, and represents where the next set of characters are displayed.

After selecting the linespace, a test rectangle A is generated in step 710. The test rectangle A has the full width of the cell and a height based on the tallest character from the set of characters that fit within the width of the test rectangle. Generally, a test rectangle represents a displayable line of the cell that contains characters. A test rectangle is a formatting aid used to arrange characters in a line of a cell before displaying the characters in the cell. A test rectangle has a certain height and width depending on the cell's width and the height of the characters that are placed in it. After determining how many characters fit within the test rectangle, those characters are placed in the linespace of the cell.

To determine the height of test rectangle A, the width is defaulted to be the full width of the cell. The height of the test rectangle A is determined by taking into account the height of the tallest character from the set of characters that fit within the width of test rectangle A. At the completion of step 710, a height and width of test rectangle A and number of characters that fit in test rectangle A are known.

After generating the test rectangle A in step 710, the method 700 proceeds to step 715 where a new test rectangle B is generated that takes into account the constraint in the cell. A constraint in the cell may be at different locations at different linespaces in the cell. For example, in a cell with a Northwest/Southeast diagonal, the diagonal constraint at the top of the cell intersects most of the line starting very close to the left-hand side. Yet, at linespaces near the bottom of the Northwest/Southeast diagonal only a little of the cell's line intersects the constraint, i.e., close to the right-hand side of the cell. Because the test rectangle A is a representation of the line beginning at a linespace in the cell, where the constraint intersects the line will be the same as where the constraint intersects the test rectangle A.

Therefore in step 715, the constraint is applied to the test rectangle A to determine where the constraint intersects the test rectangle A and consequently, where the constraint intersects the line at the current linespace in the cell. It is desirable to remove the area of test rectangle A that intersects the constraint. And again, it is preferable that the removed area be rectangular. To perform this, the test rectangle A is divided into subsections. Each subsection that intersects the constraint is removed from the test rectangle A. The result is a test rectangle B that may be narrower than test rectangle A. It will be recognized by one skilled in the art that the narrower the subsections are defined, the greater the probability that the test rectangle B will be at the maximum width without overlapping the constraint.

At step 720, the method 700 then calculates the height of test rectangle B based on the height of the tallest character from the set of characters that fit within the width of test rectangle B. Test rectangle B may have a different width then test rectangle A. Because of the different width, it is possible that a fewer number of characters, i.e., a smaller character set, fit in test rectangle B than in test rectangle A. And because of the possibility of a smaller character set, the height of the tallest character in the smaller character set may be different from the height of the tallest character in the character set used for test rectangle A. For example, in the instance where a cell has a diagonal constraint and the test rectangle A represents a line located in the middle, vertically, of the cell, approximately half of the test rectangle A is removed to generate test rectangle B because of the constraint (see FIG. 6b). It is possible that the characters that would have occupied the part of the test rectangle A that was removed were of greater height than those that occupy test rectangle B. In this case at step 720, the height of the test rectangle B can be reduced to provide a closer fit to the characters. Furthermore, at a different height, the area where the test rectangle intersects the constraint can differ, thereby requiring that fewer sections of the test rectangle be removed. This, in effect, increases the width of the test rectangle B.

It is possible to display the characters using the initial height of test rectangle B. However, this may allocate too much vertical space in the cell for the characters in test rectangle B giving an unnatural visual proportion of size of characters compared to the vertical space between the lines in the cell (see FIG. 6b). Also, changing the format of the characters could affect the layout of the preceding lines, which is undesirable.

To address these effects, the height calculated based on the tallest character from the set of characters that fit within the width of test rectangle B is compared to the height of test rectangle A in step 725.

If the calculated height based on the tallest character that fits into test rectangle B is less than the height of the test rectangle A, then additional formatting needs to be performed, and the method 700 proceeds to step 730. However, if the calculated height based on the tallest character that fits into test rectangle B is equal to the height of the test rectangle A, then the height of test rectangle B should not be modified, and the method 700 proceeds to step 755.

In the case where the calculated height based on the tallest character that fits into test rectangle B is less than the height of test rectangle A, the method 700 proceeds at step 730 to calculate a new height and width of another test rectangle to provide a better fit of characters in the cell line at the linespace. Test rectangle C is formed using the entire width of the cell and the height based on the tallest character that fits into test rectangle B.

Proceeding to step 735, test rectangle D is then generated by applying the constraint to test rectangle C. Test rectangle D is generated by removing the sections of test rectangle C that intersect the constraint. Because the height of the test rectangle C is smaller than the height of the test rectangle A, i.e., it is formed because the smaller character height in test rectangle B, it is possible that fewer sections of the test rectangle C need to be removed to generate test rectangle D than was required to be removed from test rectangle A to form test rectangle B. Hence, because fewer sections may be removed, test rectangle D may have a greater width than test rectangle B. Also, because of test rectangle D's potentially greater width, more characters may be able to be placed in test rectangle D than in test rectangle B. Having more characters placed in the test rectangle (and eventually in the linespace) and having the height of the test rectangle (the vertical area in the linespace allocated to the characters) more in proportion to the characters displayed in the linespace provides three benefits. First, it allows more characters to be displayed in the cell, thereby providing more efficient use of the space in the cell. Second, it provides a more pleasing visual image where the vertical spacing used for characters is more in proportion with the size of the characters. And third, it ensures that when characters are formatted, the layout of the text preceding those characters are not affected, which could be very disorienting to a user editing the document if allowed to occur.

After test rectangle D is calculated, a height based on the tallest character that fits into test rectangle D is determined in step 740 using the current width of the test rectangle D. A final comparison of the height based on the tallest character that fits into test rectangle D versus the height of test rectangle C is performed in step 745. If the height based on the tallest character that fits into test rectangle D is less than or equal to the height of test rectangle C, then method 700 proceeds to step 755 where the characters are placed at the linespace in the cell. At this point, it should be recognized by those skilled in the art that it is possible to perform another, if not several, iterations of test rectangle calculations to determine if there is even a closer fit of a test rectangle in the cell line (for example, calculating test rectangles E and F). However, while more iterations may be performed, the degree to which a closer fit is achieved decreases drastically as the iterations increase. This requires that one implementing this invention offset the minimal advances achieved by additional iterations with the cost of computation time and resources. In addition, the complexity of implementing this method is also dependent on the type of constraint used. For example, if the constraint is known in advance to be an increasing diagonal (i.e., a diagonal progressing from the Northwest corner to the Southeast corner), the width of the test rectangle would be known immediately without the need for several iterations.

Continuing with method 700, if in step 745 the height based on the tallest character that fits into test rectangle D is greater than the height of test rectangle C, then an invalid result has occurred, and the method 700 proceeds to advance to the next linespace within the cell in step 760. Under this condition, no characters are placed at the linespace. All the characters used to calculate the four test rectangles A–D remain undisplayed and will be saved to determine if they can be displayed in the cell line at the next linespace.

At step 755, the method 700 places the characters from the test rectangle at the linespace in the cell. A valid character set that fits in the cell line at the line space without overlapping the constraint has been determined and therefore can be displayed in the cell. This step 755 is entered either from step 725 or step 745. If step 755 is entered from step 725, the characters that fit into test rectangle B are displayed at the linespace. If step 755 is entered after step 745, the characters that fit into test rectangle D are displayed at the linespace.

At step 760, the method 700 advances to the next linespace in the cell. The next linespace is determined by moving down a vertical distance equal to the height allocated for the characters for the previous linespace. However, the vertical distance to advance to the next linespace can be arbitrary. The smaller the vertical distance, the more densely packed the layout will be. Whereas the larger the vertical distance, the less densely packed and less costly (in terms of computation time) the layout will be.

Proceeding to step 762, the method 700 checks to see if there are additional characters to display and available space in the display area, at the next linespace, for another test rectangle. If there are more characters and available space, then the method 700 branches back to step 710 where it generates another test rectangle A. However in this instance, the test rectangle A is generated at the next linespace in the cell. Method 700 then proceeds to place the characters at the next linespace in the method just described above. Therefore, method 700 continues to display characters around a constraint in a cell until either there are no characters left or there is no display room left to display the characters.

If at step 762 there is not enough room for another test rectangle or no more characters exist to display, then the method 700 continues to step 765 where it stops.

In summary, the present invention is directed towards generating a divided cell in a table, capable of being edited. In one embodiment, a diagonal cell is generated by selecting one cell in the table and creating a new cell to display over the selected cell. Both cells contain a constraint that define an area where that cell cannot display characters. The selected cell contains a triangular constraint, and the new cell contains an opposing triangular constraint. The cells are displayed over top of each other, along with a diagonal, such that the display area of one cell coincides with the constraint area of the other cell. The display shows a diagonal cell capable of accepting characters and having the characteristics of other cells in the table.

To perform the object layout in a cell with a constraint, an embodiment of the present invention utilizes test rectangles to calculate the height and width of the displayable area of the cell. An initial test rectangle is calculated using the full width of the cell and the height based on the tallest character to be placed in it. The initial test rectangle is then modified by applying the constraint to the initial test rectangle and removing all the sections of the initial test rectangle that intersect the constraint. The resulting characters that fit in the modified test rectangle are presented in the display. In one embodiment, another iteration of the test rectangle method is performed if the characters that fit in the modified test rectangle have a smaller height than those that fit within the initial test rectangle.

Alternative embodiments will become apparent to those skilled in the art to which the present invention pertains without departing from its spirit and scope. Accordingly, the scope of the present invention is described by the appended claims and is supported by the foregoing description.

What is claimed is:

1. A computer-implementable method for generating a divided cell in a table, comprising:

receiving a selection of a first cell within the table;

generating a second cell in the table;

applying to the first cell a first constraint limiting placement of a first object within the first cell to a subspace of the first cell;

applying to the second cell a second constraint limiting placement of a second object within the second cell to a subspace of the second cell; and generating the divided cell by overlapping the first cell and the second cell on a display device, wherein the first object within the first cell can be simultaneously viewed with the second object within the second cell while maintaining the first constraint and second constraint.

2. The method of claim 1, wherein the divided cell comprises a diagonal cell.

3. The method of claim 2, wherein the first constraint comprises a triangular constraint and the second constraint comprises an opposing triangular constraint.

4. The method of claim 1, further comprising placing the first object in the first cell and the second object in the second cell.

5. The method of claim 4, wherein the first object can be formatted independently of the second object.

6. The method of claim 4, further comprising:

editing the first object; and reapplying the first constraint to the first cell in order to display the edited first object within the subspace of the first cell.

7. The method of claim 4, further comprising:

editing the second object; and reapplying the second constraint to the second cell in order to display the edited second object within the subspace of the second cell.

8. The method of claim 4 further comprising:

resizing the first cell;

after resizing the first cell, reapplying the first constraint to the first cell in order to display the first object within the subspace of the first cell;

resizing the second cell;

after resizing the second cell, reapplying the second constraint to the second cell in order to display the second object within the subspace of the second cell.

9. The method of claim 1, wherein generating the divided cell by overlapping the first cell and the second cell on the display device comprises completely overlapping the first cell and the second cell on the display device, and wherein the first constraint and the second constraint are opposing constraints such that an entire viewable area of the divided cell consists of the subspace of the first cell and the subspace of the second cell and such that the subspace of the first cell does not overlap the subspace of the second cell.

10. The method of claim 9, further comprising displaying a divider separating the subspace of the first cell from the subspace of the second cell in the divided cell.

11. The method of claim 1, further comprising storing an indicator that the divided cell comprises the first cell and the second cell.

12. A computer-readable medium having computer-executable instructions for performing the method of claim 1.

13. A computer system adapted to perform the method of claim 1.

14. The method of claim 1, wherein the first cell and the second cell share an identical display address after generation of the divided cell.

15. In a computer system having a display, a method for generating a diagonal cell in a table, comprising:

selecting a first cell in the table;

selecting a direction of a diagonal;

generating a second cell in the table, the second cell having the same formatting characteristics as the first cell;

generating a triangular constraint for the first cell based on the selected diagonal direction, wherein the triangular constraint defines a triangular area within the first cell;

generating an opposing triangular constraint for the second cell based on the selected diagonal direction, wherein the opposing triangular constraint defines a triangular area within the second cell;

placing objects in the first cell and the second cell;

displaying the objects in the triangular area of the first cell;

displaying the objects in the triangular area of the second cell; and overlapping the first cell and the second cell on the display to create the diagonal cell.

16. The method of claim 15, wherein the objects contained in second cell are capable of being formatted independently of the objects in the first cell.

17. The method of claim 15, further comprising:

editing the objects in the first cell;

reapplying the triangular constraint to the first cell such that the edited objects displayed in the first cell are in the triangular area of the first cell.

18. The method of claim 15, further comprising:

editing the objects in the second cell;

reapplying the opposing triangular constraint to the second cell such that the edited objects displayed in the second cell are in the triangular area of the second cell.

19. The method of claim 15, further comprising:

resizing the first cell;

after resizing the first cell, applying the triangular constraint to the first cell in order to display the objects of the first cell within the triangular area of the first cell;

resizing the second cell;

after resizing the second cell, applying the opposing triangular constraint to the second cell in order to display the objects of the second cell within the triangular area of the second cell.

20. The method of claim 15, wherein the triangular constraint comprises two adjacent edges of the first cell and the diagonal.

21. The method of claim 15, wherein the opposing triangular constraint comprises two adjacent edges of the second cell and the diagonal.

* * * * *